United States Patent [19]

Elmore et al.

[11] 4,291,128
[45] Sep. 22, 1981

[54] PROCESS FOR MAKING UREA-FORMALDEHYDE INSULATION

[75] Inventors: Charles E. Elmore; David H. Harmon, both of Dallas, Tex.

[73] Assignee: Ciba-Geigy Corporation, Ardsley, N.Y.

[21] Appl. No.: 119,870

[22] Filed: Feb. 8, 1980

[51] Int. Cl.³ ............................................. C08J 9/36
[52] U.S. Cl. ..................................... 521/54; 521/136; 521/187; 521/188
[58] Field of Search .................. 521/187, 188, 54, 136

[56] References Cited

U.S. PATENT DOCUMENTS

| | | | |
|---|---|---|---|
| 2,664,406 | 12/1953 | Armstrong | 521/188 |
| 2,806,509 | 9/1957 | Bozzacco et al. | 521/136 |
| 3,256,218 | 6/1966 | Knox | 521/54 |
| 3,290,260 | 12/1966 | Buccigross | 521/188 |
| 3,957,700 | 5/1976 | Ferriday et al. | 521/188 |
| 3,957,701 | 5/1976 | Cutler et al. | 521/188 |

Primary Examiner—Morton Foelak
Attorney, Agent, or Firm—Richards, Harris & Medlock

[57] ABSTRACT

A process and apparatus are provided for making desired shapes of urea-formaldehyde suitable for use as insulation from urea-formaldehyde foam. Fluid urea-formaldehyde foam (A) is formed into discrete particles (A') in particle generator (10) which also partially cures particles (A'). After particles (A') are fully cured, they are blended with fluid urea-formaldehyde foam in mixing apparatus (11) which includes blending head (66) to produce mixture (C) which is a coherent mass. Mixture (C) is molded to the desired cross-sectional shape by molding conveyor (12). Cutter (132) cuts formed mixture (C) into the desired length. Thereafter oven (146) is utilized for fully curing the product which is then enclosed in a suitable packaging material.

12 Claims, 9 Drawing Figures

PROCESS FOR MAKING UREA-FORMALDEHYDE INSULATION

TECHNICAL FIELD

This invention relates to insulation and more particularly to a process and apparatus for making pre-cured urea-formaldehyde insulation of desired shapes from urea-formaldehyde foam.

BACKGROUND ART

It is well known that lightweight shapes of cured urea-formaldehyde resins can be produced from urea-formaldehyde foam and other resin solutions by incorporating a curing agent which causes gelling and curing of the resin solution together with a foaming or wetting agent. The resin solution can be mechanically beaten in order to incorporate finely-divided air bubbles, which are stabilized by the foaming agent, and is allowed to cure in a mold or cavity. Such foamed shapes generally have very low mechanical strength and usually exhibit significant shrinkage and deformation, such as warping and cracking upon curing, due to the loss of considerable quantities of water present in the mixture and produced during the curing reaction.

It is also known to use urea-formaldehyde resins as insulating materials, for example, in the walls of buildings, by injecting an uncured or liquid urea-formaldehyde foam into wall air spaces and voids. However, use of urea-formaldehyde foam in this manner suffers from serious drawbacks. First, free formaldehyde present in the foam migrates from the foam by evaporation thereby creating a significant odor problem. Second, from several days to in excess of three weeks may be required for the foam to cure within the walls. Third, the excellent potential insulating qualities of the cured urea-formaldehyde foam are not fully realized due to shrinkage, warpage and other deformation that occurs when water contained in the urea-formaldehyde resin evaporates. As a result, a significant amount of air can still migrate through the walls that contain the insulation.

Thus, a need exists for a process and apparatus for processing urea-formaldehyde foam into desired shapes without significant shrinkage and deformation.

DISCLOSURE OF THE INVENTION

A method and apparatus for producing urea-formaldehyde foam in desired shapes is provided. The process according to the invention includes forming discrete urea-formaldehyde foam particles from a urea-formaldehyde foam solution containing urea-formaldehyde resin, a wetting agent and a curing agent. The uncured foam particles are cured into discrete urea-formaldehyde foam particles. After curing, the particles are mixed with a urea-formaldehyde foam containing urea-formaldehyde resin, water, a wetting agent and a curing agent to form a resulting mixture that is a coherent mass which is formed into the desired shape. The resulting mixture is cured to provide the final product of urea-formaldehyde having the desired shape.

In accordance with the invention, a particle generator is provided for forming and partially curing urea-formaldehyde foam particles from urea-formaldehyde foam. The particle generator contains a vertical duct through which a monofilament stream of urea-formaldehyde foam may be injected surrounded by a laminar co-current air stream which assists in transporting urea-formaldehyde foam through the duct.

The particle generator includes an upright elongated shell having a top and bottom for housing the vertical duct. The top of the cylindrical shell has an opening therein for permitting air to be discharged through the opening from the interior of the shell. The vertical duct contained within the shell extends upwardly from the bottom of the shell and is generally disposed along the longitudinal axis of the shell, terminating in the upper portion of the shell. A baffle located between the end of the duct and the top opening prevents air flow directly from the duct into the top opening and directs the stream of foam radially outwardly after exiting the duct to form discrete particles of urea-formaldehyde foam. As the particles of foam fall to the bottom of the generator, the particles partially cure and form an outer surface or skin that is sufficiently cured so that the particles remain separate from one another when reaching the bottom of the particle generator. To facilitate curing of the particles and to increase the airborne residence time of the particles, the particle generator provides for the injection of air upwardly from the bottom of the shell. Air exiting from the top of the shell is preferably recycled for injection upwardly from the bottom of the shell.

The partially cured foam particles are conveyed from the bottom of the particle generator to a storage tank for fully curing the particles. The fully cured foam particles are conveyed to an apparatus for mixing the foam particles with uncured urea-formaldehyde foam. The mixing apparatus includes a feed hopper for the cured particles, a screw conveyor and a blending head at the end of the screw conveyor that injects and mixes the fluid (uncured) urea-formaldehyde foam among the cured particles to produce a resulting mixture of cured urea-formaldehyde foam and uncured urea-formaldehyde foam. The screw conveyor is formed from a spiral flight that is secured to a hollow tube. The hollow tube is mounted within a housing for rotational movement with respect to the housing. A hollow drive shaft is coaxially mounted within the hollow tube for rotation independently of the hollow tube, the hollow drive shaft providing a rotational force for the blending head. A feed pipe is coaxially mounted within the hollow drive shaft and is restrained from rotation with respect to the hollow drive shaft. The feed pipe provides a feed of fluid urea-formaldehyde foam to the blending head.

The blending head includes a cone-shaped housing having a neck portion dimensioned to accept the feed pipe, the housing being mounted for rotational movement with respect to the feed pipe. The housing terminates in a flat base opposite the neck and includes a fluid passageway extending from the neck portion towards the base of the housing. A plurality of spaced apart mixing blades extend outwardly from the curved side of the housing and include openings for foam discharge that communicate with the fluid passageway for discharge of the uncured (fluid) urea-formaldehyde foam from the blades. The blades also serve to blend the uncured foam together with the cured foam particles. Reciprocating brushes are located within the blades to maintain the openings free of obstructions.

The resulting mixture is then molded in a molding apparatus to achieve the desired shape for the final product. The molding apparatus includes a conveyor line containing four separate conveyor belts that are aligned with respect to each other to form an enclosed area that corresponds with the desired cross-section configuration and dimensions of the cured urea-formaldehyde block or board. A compression zone is formed at the entrance to the area enclosed by the conveyor belts and applies a compression force to the mixture of cured and uncured urea-formaldehyde foam.

Upon exiting the molding apparatus, the mixture is self-supporting and is of the desired cross-sectional dimensions and configuration, generally with a small allowance for shrinkage. A cutting mechanism cuts the formed mixture into the desired length. The formed mixture then is preferably cured in an oven and packaged in a suitable material, resulting in an improved insulating material.

BRIEF DESCRIPTION OF DRAWINGS

The present invention can be more completely understood from the following detailed description when read in conjunction with the accompanying drawings in which.

DETAILED DESCRIPTION OF THE INVENTION

The present invention provides a process and apparatus for the production of urea-formaldehyde foam articles, generally in a board or block shape, that do not significantly crack, warp or otherwise distort upon curing and can be utilized as insulating material. For example, typical board shapes that have a thickness of 3.5 inches exhibit a relative "R" value of about 17 whereas typical fiberglass insulation of equal thickness has an "R" value of about 11.

As used herein, urea-formaldehyde foam or foam includes a urea-formaldehyde resin curing agent and water. Generally, a wetting or foaming agent is also included to facilitate foaming. Further, uncured foam is in fluid form and cured foam denotes a solid material. Foam is produced by entraining small air bubbles in the mixture of resin, curing agent, water and generally, a wetting agent. Methods of producing urea-formaldehyde foam are well known in the art.

For use in accordance with the process of the present invention, urea-formaldehyde foam may be prepared according to any of the known procedures for producing urea-formaldehyde foam, including those described in U.S. Pat. Nos. 3,284,379, 3,963,650, 3,150,108, 4,069,175, 4,129,533, Canadian Pat. No. 1,013,499, British Pat. No. 1,470,953 and an article in the *Journal of Applied Polymer Science* entitled "Mechanical Properties of Urea-Formaldehyde Foam," by Sarig and Little, Vol. 22, pages 419–427 (1978), each of the foregoing references being incorporated by reference herein.

Figure 1:
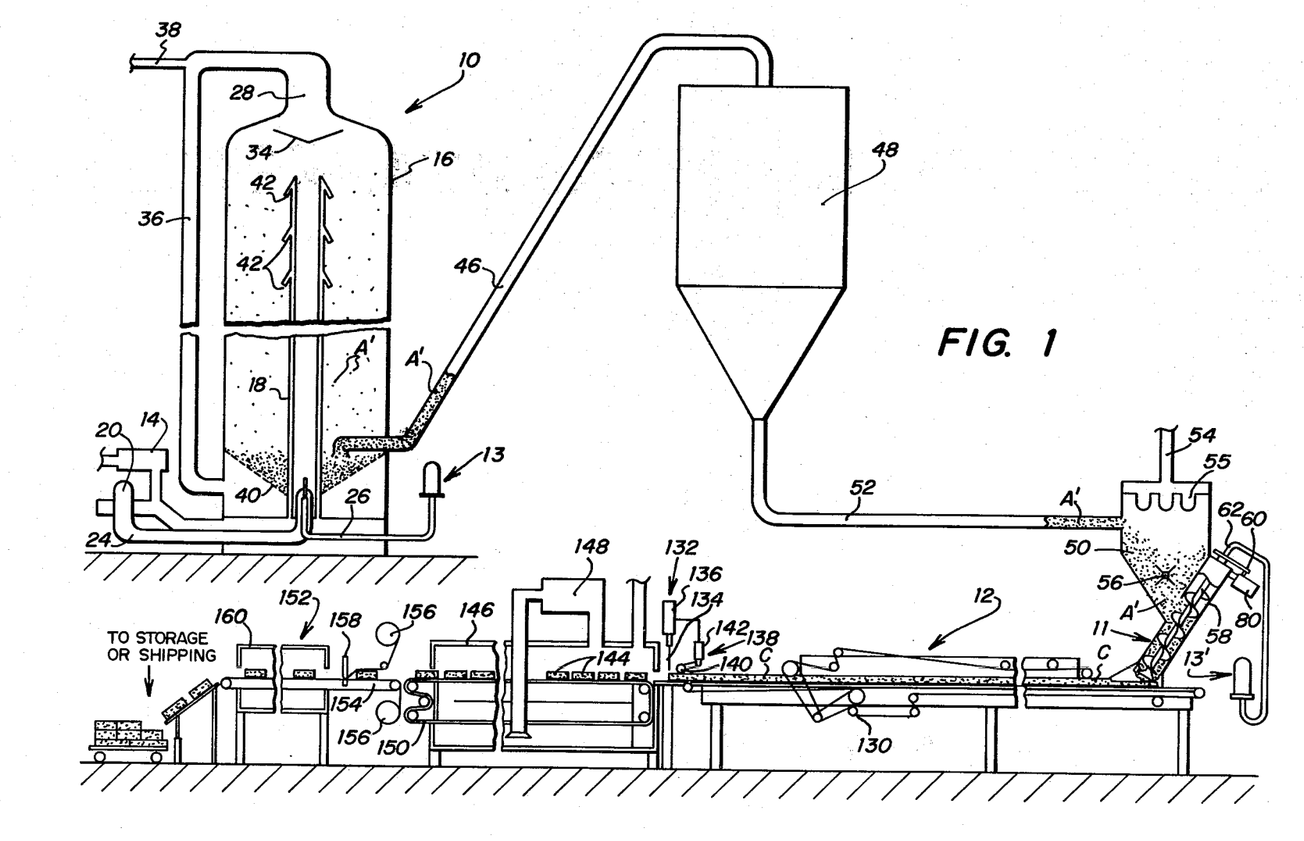
FIG. 1 is a semi-diagrammatic view of the process and apparatus in accordance with the present invention.
Figure 2:
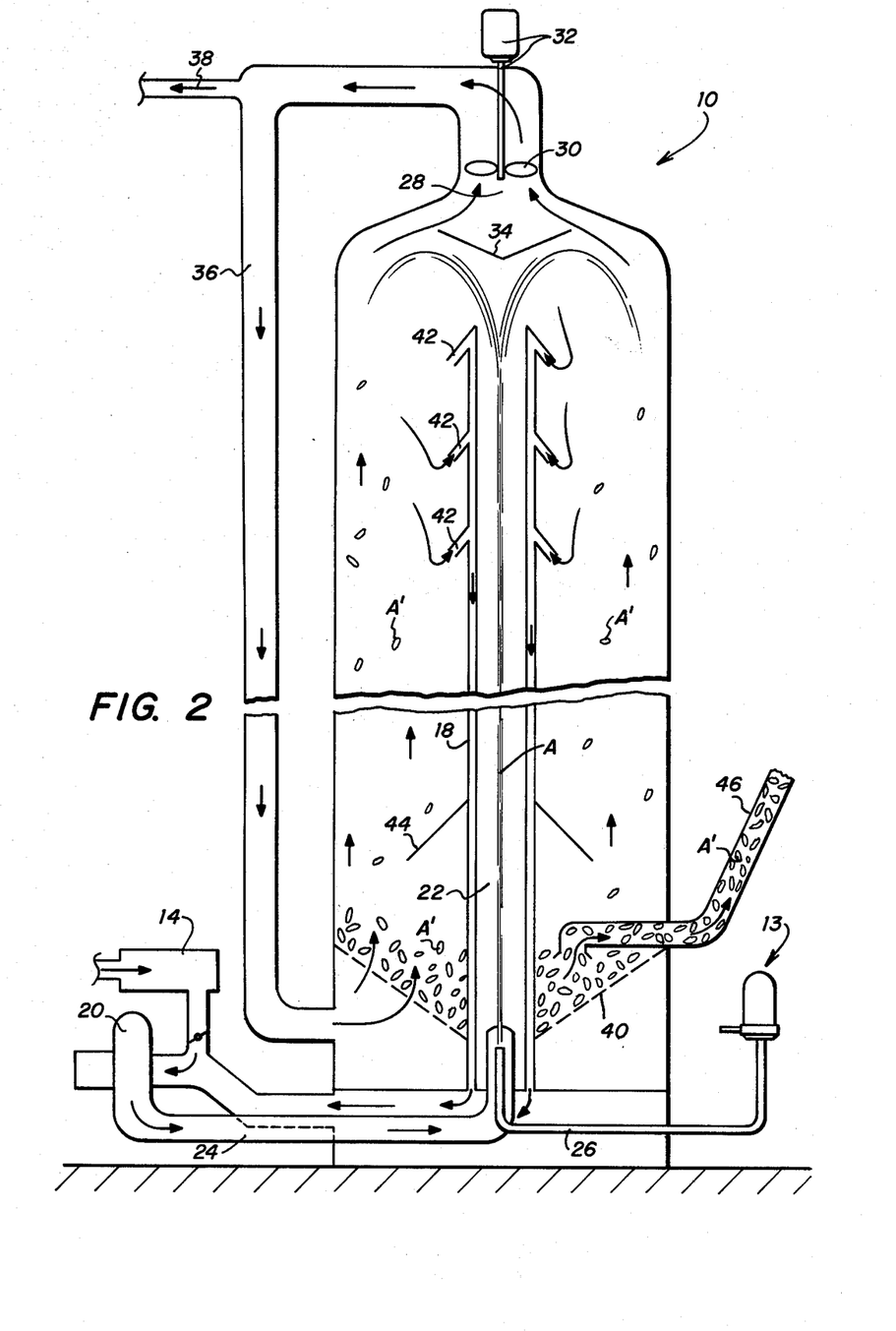
FIG. 2 is an elevational view in section of a particle generator in accordance with the present invention.

According to the present invention, urea-formaldehyde foam is cured into relatively small particles, for example, generally from about one half to six inches in length and about one quarter to about one inch in thickness or diameter. Preferably, the urea-formaldehyde particles have a generally circular cross-section and are formed and partially cured by utilizing a particle generator 10 as depicted in FIGS. 1 and 2, which will be hereinafter described in detail.

After the discrete urea-formaldehyde particles have been formed and cured, these particles are then uniformly dispersed within fluid urea-formaldehyde foam to form a resulting mixture that is a coherent mass. The cured urea-formaldehyde particles form a matrix which gives support for the uncured foam. Generally, the ratio of cured urea-formaldehyde to uncured foam is between about 5:5 and 8:2 on a volume basis and preferably about 3:1. It is to be understood that this ratio may vary depending upon the particular type of foam urea-formaldehyde resin utilized. For example, if the foam has a relatively high solids content, the ratio of dry urea-formaldehyde to uncured foam could decrease. Similarly, other physical characteristics of the urea-formaldehyde foam, such as the amount of air contained in the foam, density, viscosity, and gel time may also influence the desired ratio of cured urea-formaldehyde to uncured urea-formaldehyde foam. The cured urea-formaldehyde foam particles are preferably mixed with uncured urea-formaldehyde foam utilizing a mixing apparatus 11 that is hereinafter described in detail with respect to the FIGURES. The resulting mixture can be cured relatively quickly compared with a similar shape containing only uncured foam.

After the uncured foam has been mixed with the cured particles, the resulting mixture is molded into the desired shape of the final cured product. Generally, it is anticipated that the desired shape will be in the form of an elongated block or board, although such a shape is not a limitation of the invention. In accordance with the invention, the resulting mixture is preferably molded by a molding conveyor 12 as shown in FIG. 1, which will be hereinafter described in detail.

After formation of the cured/uncured mixture of urea-formaldehyde foam into the desired configuration, the final curing is accomplished preferably by heating, although the final curing could be accomplished at room temperature. Generally, it is anticipated that a much longer time would be required for final curing without additional heat. After the desired urea-formaldehyde shapes have been cured, they are preferably enclosed in a suitable material such as polyethylene or a foil laminate. Packaging of the cured urea-formaldehyde may be accomplished by any method known to those skilled in the art.

It is desirable to maximize the amount of cured urea-formaldehyde particles present in the resulting mixture, while forming a coherent mass, since utilizing a maximum amount of cured urea-formaldehyde particles in the resulting mixture contains less water and free formaldehyde that must be removed to form the completely cured product and thereby any shrinkage or warpage is minimized.

Referring to the FIGURES generally, and in particular to FIG. 1, there is illustrated a process line including apparatus in accordance with the invention for carrying out the process of the invention. A foam generator 13, depicted schematically, produces urea-formaldehyde foam A from a urea-formaldehyde feed stock in accordance with any method known to those skilled in the art. Urea-formaldehyde foam A is then injected into particle generator 10. Preferably, foam A is heated prior to injection into particle generator 10 to facilitate curing. The temperature within particle generator 10 is preferably maintained at a temperature in excess of atmospheric temperature so that the relative humidity within particle generator 10 is less than about 50%. A furnace 14 can be utilized to heat makeup air for particle generator 10 to maintain the desired temperature.

The function of particle generator 10 is to produce discrete particles A' of urea-formaldehyde foam A that are partially cured and self-supporting. Particle generator 10 includes an outer shell 16 and a vertical duct 18. Outer shell 16 is preferably cylindrical in shape and vertical duct 18 is preferably located along the longitudinal center line of outer shell 16. Urea-formaldehyde foam A is partially cured in particle generator 10 by removing water from the foam. Therefore, it is desirable to maintain the relative humidity of the air within particle generator 10 generally under about 50% so there is a sufficient driving force to evaporate water from the particles. The humidity is maintained within the desirable limits by a system of air heating and circulation within particle generator 10. A blower 20 is utilized to inject air 22 through air supply line 24 and upwardly into vertical duct 18. A foam injection pipe 26 is located coaxially within the terminal portion of air supply line 24 as illustrated in FIG. 2. This permits the injection of a monofilament stream of foamed urea-formaldehyde foam A surrounded by a co-current stream of air 22 from air supply line 24. Injection pipe 26 preferably has an inside diameter of between about ¾ and 1 inch. Foam injection pipe may be coated interiorly with a material such as a tetrafluoroethylene fluorocarbon polymer to facilitate cleaning. Preferably, the ratio of the velocity of air entering vertical duct 18 via air supply line 24 to the velocity of foam injected through injection pipe 26 is about 10:1. The bulk of the air entering particle generator 10 exits through opening 28 located in the top of particle generator 10. A fan 30 located in opening 28 is driven by motor and shaft 32 and assists in drawing air from particle generator 10 and causes air within shell 16 to rotate in the direction that fan 30 rotates. An inverted cone-shaped baffle 34 is located adjacent opening 28 and above the top of vertical duct 18 causing air to be directed around cone-shaped baffle 34 which causes the monofilament stream of foam to be directed towards the periphery of outer shell 16 to form discrete particles A'.

Air exiting through opening 28 in the top of particle generator 10 is split into a recycle stream 36 and a bleed-off stream 38 so that moisture removed from the foam is removed from particle generator 10.

Particle generator 10 preferably has a cone-shaped bottom 40. This facilitates accumulation of the discrete particles A'. Upon reaching the bottom of particle generator 10, foam particles A' must be sufficiently cured so that they are self-supporting and remain discrete from each other. Thus, the design parameters and air flow and temperature requirements for particle generator 10 will depend on the gel time and cure time of the foam utilized. Cone-shaped bottom 40 can be perforated with holes 41 to allow the air in recycle stream 36 to pass through the perforations to further cure foam particles A' resting at the bottom of particle generator 10. The air injected from recycle stream 36 through cone-shaped bottom 40 provides an air cushion for foam particles A' formed near the top of particle generator 10, thereby increasing the airborne residence time of particles A'. This is desirable because particles A' must be sufficiently cured by the time the bottom of particle generator 10 is reached so that particles A' remain separate from each other. In the preferred embodiment, air injected from recycle stream 36 is injected tangentially with respect to shell 16 to complement the rotating air pattern in particle generator 10. Preferably, airborne residence time of the foam, from the time it enters vertical duct 18 to the time it reaches bottom 40 is from about 30 seconds to about 2 minutes.

Preferably, a plurality of cone-shaped air intakes 42 extend outwardly and downwardly at spaced apart intervals from the top portion of vertical duct 18, for counteracting the centrifugal force on the particles from the rotating air pattern in particle generator 10 to prevent the particles from contacting shell 16. A suction force is provided by blower 20 to draw air into cone-shaped air intakes 42. Air passing through cone-shaped air intakes 42 is optionally utilized with makeup air being heated by furnace 14, if necessary, to maintain the desired temperature in particle generator 10. Preferably, a large, downwardly extending cone-shaped baffle 44 is mounted on vertical duct 18 along its lower portion to permit creation of a quiescent zone below cone-shaped baffle 44 to permit accumulation of partially cured urea-formaldehyde particles A'.

Partially cured foamed urea-formaldehyde particles A' are pneumatically conveyed from bottom 40 of particle generator 10 through line 46 to storage vessel 48. Particles A' are allowed to fully cure in storage vessel 48. It may take from several hours to a day or more for particles A' to fully cure. To hasten the curing process in storage vessel 48, warm air may be injected through the bottom of storage vessel 48 (not shown). Further, the temperature within storage vessel 48 is preferably slightly elevated to further hasten the curing of particles A'. Preferably, storage vessel 48 is utilized so that particles A' are stored and withdrawn on a first-in-first-out basis to facilitate the operation of a continuous process. Several storage vessels may also be incorporated in the process according to the present invention to provide an adequate supply of cured urea-formaldehyde foam particles.

According to the next step of the process of the present invention, cured particles A' are uniformly combined with uncured (fluid) urea-formaldehyde foam. Particles A' are preferably conveyed pneumatically from storage vessel 48 to cured particle storage hopper 50 via line 52. The bottom of storage hopper 50 communicates with mixing apparatus 11 as shown in FIG. 1. An air return 54 and filter 55 located within storage hopper 50 form part of the pneumatic conveying system (not shown) to convey particles A' to storage hopper 50. Storage hopper 50 preferably incorporates a paddle feeder 56 to direct the cured particles into mixing apparatus 11.

Mixing apparatus 11 mixes cured particles A' with uncured urea-formaldehyde foam in a desired proportion determined by the relative feed rates of particles A' and liquid foam, to form a resulting mixture C. As shown in FIG. 1, the foam is obtained from a foam generator 13', which can be similar to foam generator 13. Mixing apparatus 11 includes a housing 58, a drive mechanism 60, a feed pipe 62, a screw conveyor 64 and a blending head 66 for uniformly mixing cured particles A' with uncured foam. Feed pipe 62 is restrained from rotational movement by a sleeve 67 and allows uncured foam to be directed into blending head 66. Screw conveyor 64 includes a spiral flight 68 mounted on the exterior of a hollow tube 70. Blending head 66 is mounted for rotational movement provided by drive shaft 72. Drive shaft 72 is hollow and dimensioned to be mounted coaxially within hollow tube 70 of screw conveyor 64. Hollow drive shaft 72 has an interior diameter that permits feed pipe 62 to be coaxially contained therein. Feed pipe 62, hollow tube 70 and drive shaft 72 are separated from each other and are permitted to rotate with respect to one another by means of bushings 74 and 76. Bushing 78 allows screw conveyor 64 to be rotatably mounted within housing 58. Drive mechanism 60 includes a motor and transmission 80 together with a drive gear 82 for drive shaft 72 and a drive gear 84 for hollow tube 70 of screw conveyor 64 which are shown schematically in FIGS. 1 and 3.

Preferably, screw conveyor 64 is mounted at an angle of about 45° from horizontal for optimal feed of the cured urea-formaldehyde particles. In this manner, the uncured foam is able to gel at approximately the same location on molding conveyor 12. The uncured foam in mixture C gels at some point past the compression zone 128, hereinafter described, and preferably immediately after exiting compression zone 128. Blending head 66 is mounted on drive shaft 72 for rotation in the same direction as spiral flight 68. Preferably, blending head 66 rotates about 1.5 to 2 times faster than spiral flight 68.

Figure 7:
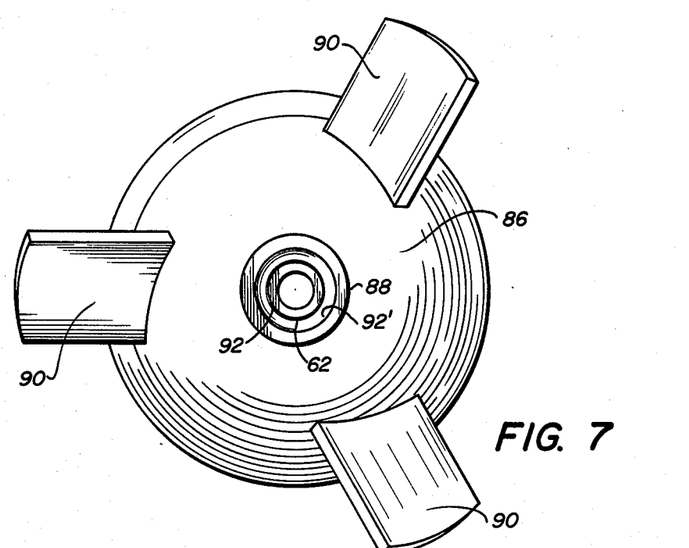
FIG. 7 is a plan view of the blending head shown in FIG. 6.

Blending head 66 includes a cone-shaped housing 86 having a neck portion 88 that extends from the apex of cone-shaped housing 86. Preferably, three foam discharge blades 90 extend outwardly from the curved side of cone-shaped housing 86, as shown in FIG. 7.

Figure 6:
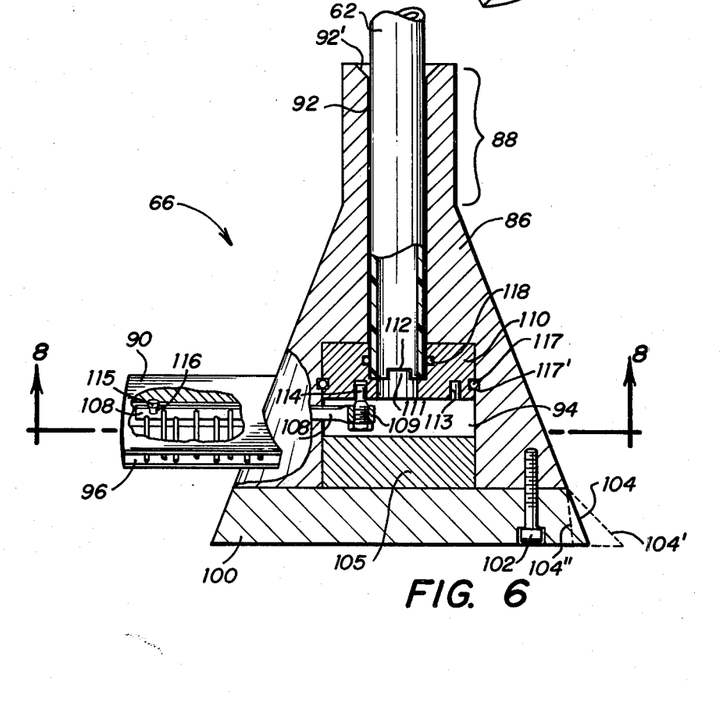
FIG. 6 is a sectional view of a blending head in accordance with the present invention.

Neck portion 88 is adapted to accommodate therein feed pipe 62 within a circular passageway 92. Circular passageway 92 is slightly larger than the outside diameter of feed pipe 62 so that blending head 66 may rotate with respect to feed pipe 62 and is slightly flared at the entrance thereof in neck portion 88 as indicated by reference numeral 92'. Cone-shaped housing 86 includes a cylindrical volume 94. Preferably the longitudinal axis of cylindrical volume 94 coincides with the axis of rotation of blending head 66.

Figure 8:
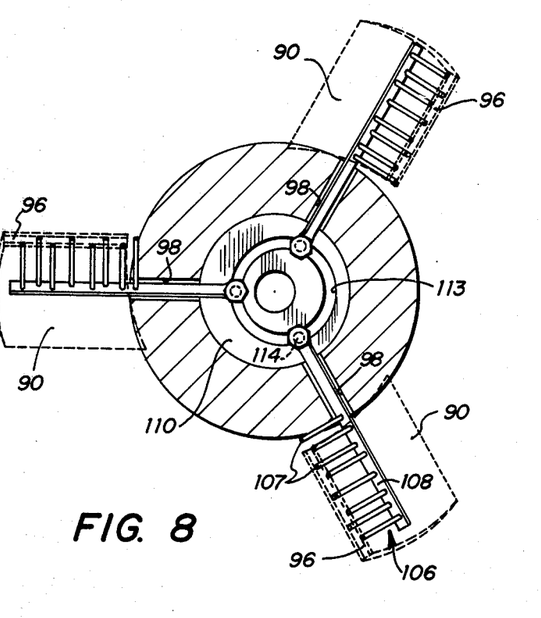
FIG. 8 is a sectional view along lines 8—8 of FIG. 6.

Each of foam discharge blades 90 includes a slot opening 96 that communicates with a passageway 98 that extends to cylindrical volume 94 to thereby allow injection of foam from feed pipe 62 out of slot opening 96. Slot opening 96 preferably extends along the entire length of the edge of discharge blade 90 that is opposite the leading edge of discharge blade 90 as blending head 66 is rotated. For example, as shown in FIG. 8, blending head 66 would be rotated in a counterclockwise direction. Preferably, each of foam discharge blades 90 is rectangular in shape and has an outermost extending edge that is slightly convex. As illustrated in FIGS. 6 and 7, foam discharge blades 90 are preferably mounted so that when the cured particles impinge upon the surface of foam discharge blades 90 the particles are deflected towards the edge of discharge blades 90 that contain slot openings 96.

A back pressure plate 100 is mounted on the base end of cone-shaped housing 86. Back pressure plate 100 may be secured to cone-shaped housing 86 by any convenient means, such as by a suitable number of screws 102. Peripheral edge 104 of back pressure plate 100 can merely form an extension of cone-shaped housing 86 as illustrated in FIG. 6 or peripheral edge 104 may be flared either inwardly or outwardly as indicated by reference numerals 104' and 104" to alter the mixing characteristics of blending head 66. Preferably, a spacer 105 is disposed at the bottom portion of cylindrical volume 94 and abuts back pressure plate 100.

Each of foam discharge blades 90 incorporates a brush 106 for maintaining slot opening 96 free of obstructions. Brush 106 includes a plurality of cleaning wires 107 that are mounted in spaced apart relation on a brush arm 108 that extends along slot opening 96 and through passageway 98 having a sleeve portion 109 that is disposed within cylindrical volume 94. Brush 106 is mounted for radial reciprocation with respect to the axis of rotation of cone-shaped housing 86. Brush 106 reciprocates by means of a cam device 110 that is fixedly mounted with respect to feed pipe 62 by a dog 111 forming part of cam device 110 that fits into complementary slot 112 at the end of feed pipe 62. Preferably, there is another dog in cam device 110 and complementary slot in feed pipe 62 opposite dog 111 and complementary slot 112. Cam device 110 has a cam surface that is preferably a circular groove 113 disposed in the bottom of cam device 110. Circular groove 113 that forms the cam surface is eccentric from the axis of rotation of cone-shaped housing 86. A cam follower 114 is disposed within circular groove 113 and fits through sleeve portion 109 of brush 106. Cam follower 114 is preferably a pin-shaped member as illustrated in FIG. 6. Thus, rotation of cone-shaped housing 86 with respect to feed tube 62 causes cam follower 114 to traverse circular groove 113 thereby radially reciprocating brush 106 with respect to the axis of rotation of cone-shaped housing 86. Brush 106 is guided by a guide pin 115 that is mounted within each of foam discharge blades 90 and extends into slot opening 96. Guide pin 115 has a slot 116 into which a portion of brush arm 108 is disposed for guiding brush 106 as it reciprocates within foam discharge blade 90.

Cam device 110 is held in place in cone-shaped housing 86 by a retaining ring 117 that is disposed within complementary slot 117' formed in cam device 110 and cone-shaped housing 86. Retaining ring 117 is preferably an O-ring that also provides a seal between cone-shaped housing 86 and cam device 110 to prevent fluid present in cylindrical volume 94 from backing up through cone-shaped head 86. O-ring 118 is disposed within complementary slot 118' in cam device 110 to form a seal between cam device 110 and feed pipe 62 to prevent foam from backing up into the space between feed pipe 62 and cone-shaped head 86.

Housing 58 terminates with discharge chute 119. After blending head 66 forms mixture C of cured and uncured urea-formaldehyde foam, mixture C is deposited on molding conveyor 12. Discharge chute 119 preferably increases in cross-sectional area as it extends towards molding conveyor 12 so that mixture C discharged from discharge chute 119 is spread over a sufficiently wide area to fill the entranceway of molding conveyor 12. Accordingly, blending head 66 is preferably cone-shaped for deflecting cured particles A' over a wider cross-sectional area to facilitate mixing with the uncured foam and to prevent the formation of air pockets within mixture C as it exits discharge chute 119. Further, the cross-sectional area within chute 119 filled by particles A' preferably remains constant in the area adjacent blending head 66 causing the uncured foam to fill void areas between particles A'.

Figure 9:
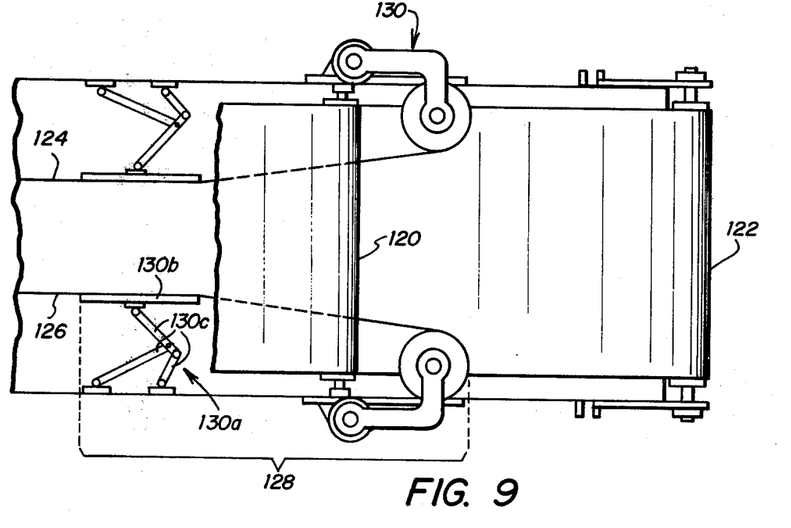
FIG. 9 is a plan view of part of the molding apparatus illustrated in FIG. 1.

Molding conveyor 12 functions as a molding machine and includes four separate conveyor belts, upper conveyor belt 120, lower conveyor belt 122, first side conveyor belt 124 and second side conveyor belt 126 as illustrated in FIG. 9. Upper conveyor belt 120 is separated from lower conveyor belt 122 by a distance that corresponds with the desired thickness of the cured block or board. First side conveyor belt 124 and second side conveyor belt 126 are aligned parallel to each other separated by a distance that corresponds with the desired width of the cured urea-formaldehyde block or board except for compression zone 128 where first side conveyor belt 124 and second side conveyor belt 126 are flared away from each other so that as mixture C of cured and uncured urea-formaldehyde advances through compression zone 128 of molding conveyor 12, a compression force is applied to mixture C helping to insure that no unwanted air spaces are present within it to facilitate formation of a uniform matrix of cured particles surrounded by uncured urea-formaldehyde foam. In addition, zone 128 provides an accumulation zone so that the discharge of mixture C can vary slightly with respect to the amount of mixture C required by molding conveyor 12 without creating unwanted voids. Thus, conveyor belts 120, 122, 124 and 126 form an enclosed area that corresponds with the desired cross-section configuration and dimensions of the cured urea-formaldehyde block or board with a compression zone 128 at the entrance to the enclosed area for compressing mixture C. Generally, a small allowance is made for shrinkage that occurs upon final curing. Molding conveyor 12 includes a drive mechanism 130 that includes a system of belts and pulleys for driving the conveyor belts at the desired rate of speed. Each of the four conveyor belts should be driven at the same rate of speed. A retaining device 130a prevents side conveyor belts 124 and 126 from bulging outwardly from the compression force that is applied in compression zone 128, and includes retaining plates 130b and retaining arms 130c as shown in FIG. 9. Retaining device 130a also allows for the width between conveyor belts 124 and 126 to be adjusted.

Figures 3, 4, 5:
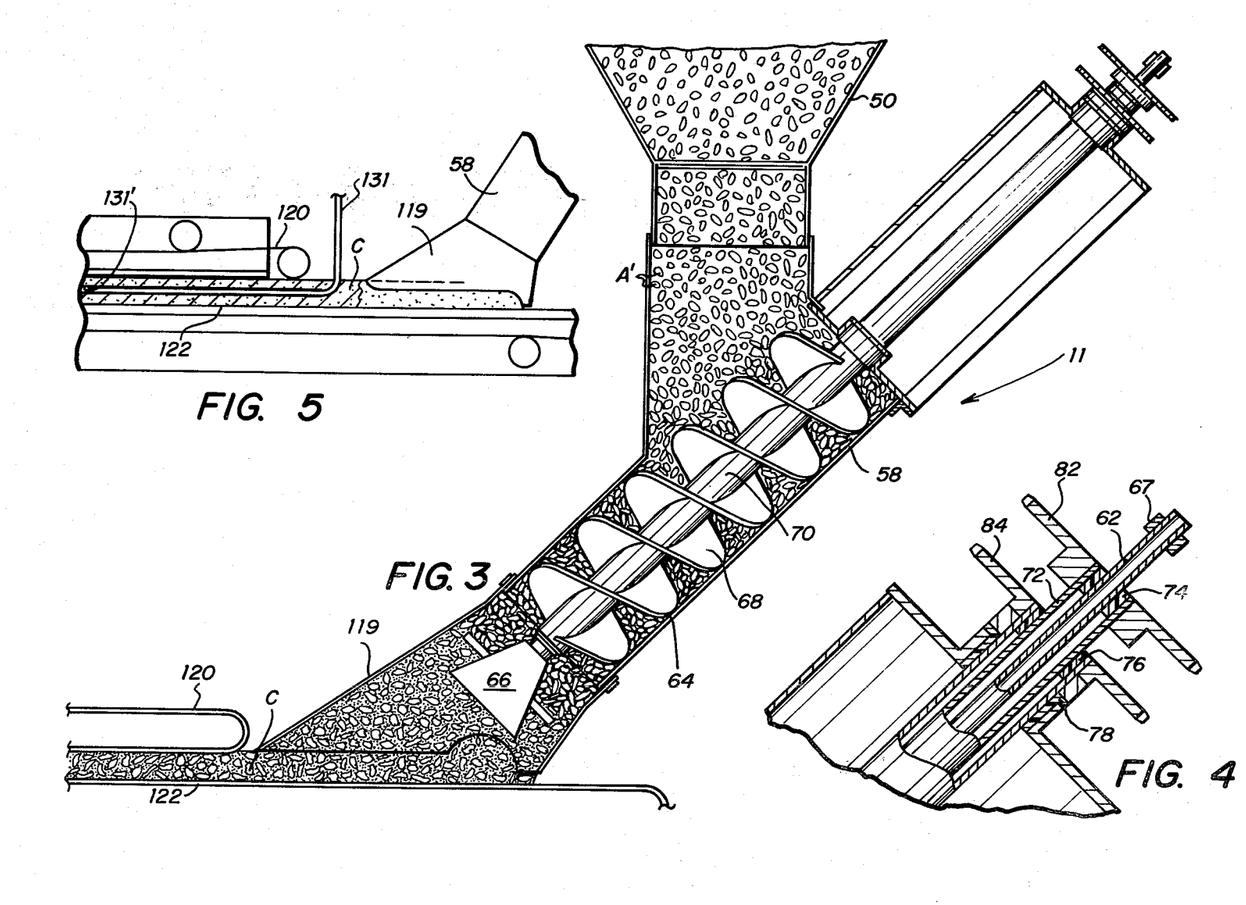
FIG. 3 is an elevational view in section of a mixing apparatus in accordance with the present invention.
FIG. 4 is a sectional view showing the relationship of various components of the mixing apparatus in accordance with the present invention.
FIG. 5 is a side view illustrating an alternate embodiment of a molding apparatus in accordance with the present invention.

FIG. 5 illustrates an alternate embodiment of the entrance to molding conveyor 12. A rod 131 is disposed within and extends downstream of compression zone 128 within the enclosed area between conveyor belts 120, 122, 124 and 126. Rod 131 should be disposed so that its longitudinal axis is parallel to the direction in which the conveyor belts travel. Rod 131 creates a void 131' within mixture C as it is formed by molding conveyor 12. In this manner, the blocks or boards that are produced in accordance with the invention may be made lighter and with less material without a great sacrifice in the insulating qualities of the finished product. A plurality of rods may also be employed to form multiple void areas within the finished product.

As mixture C exits molding conveyor 12, mixture C has been formed into a self-supporting mass of the desired cross-section configuration and dimensions. A cutter 132 cuts formed mixture C into the desired length to form board or block shapes 144. Cutter 132 includes a cutting blade 134 and a cutting blade drive mechanism 136 for advancing and retracting cutting blade 134 with respect to the formed mixture as it passes underneath cutting blade 134. Cutter 132 can be controlled by measuring device 138 which communicates with cutter 132. Measuring device 138 includes a rotatable wheel 140 that rides on the surface of the mixture as it passes underneath rotatable wheel 140 thereby causing rotation of wheel 140. Rotatable wheel 140 communicates with a counter 142. When a suitable length of formed mixture has passed measuring device 138 as determined by the revolutions of rotatable wheel 140 and recorded by counter 142, a signal is transmitted from measuring device 138 to cutter 132 for activating cutting blade 134.

After formed mixture C has been cut into the desired lengths to provide board or block shapes 144, they preferably enter oven 146 for curing. Oven 146 includes an oven furnace 148 for maintaining oven 146 at the desired temperature and oven conveyor 150 for transporting board or block shapes 144 through oven 146. Oven 146 is vented preferably to a scrubber (not shown) for removing formaldehyde that has evaporated from the urea-formaldehyde material within oven 146. Typical oven temperatures may range between about 350° to 550° F. to achieve the desired water content in the finished product. Generally, the optimum level of drying depends on the equilibrium water content of the foam at a reference environment temperature and humidity. For example, for a typical cured urea-formaldehyde foam, at about 72° F. and 50% relative humidity, the equilibrium water content of the foam will be about 7% by weight of the composition.

Preferably, the urea-formaldehyde insulation system includes a packaging apparatus 152 for enclosing the cured shapes in a suitable material such as polyethylene film or aluminum foil. The packaging material, for example, may be aluminum foil laminated with polyethylene film. Any suitable device may be used to package the cured shapes in the desirable package material. For example, as depicted in FIG. 1, packaging apparatus 152 includes packaging conveyor 154 for transporting the cured shapes through packaging apparatus 152, packaging material dispensing rolls 156, packaging material cutter 158 for cutting the packaging material after the cured shapes are between layers of the packaging material and a packaging oven 160 operated at a temperature sufficient for the packaging material to form an enclosed envelope around the cured shapes. The packaged cured shapes are then ready for use and may be shipped or stored as required. Optionally, powdered urea can be packaged with the cured shape to absorb any free formaldehyde remaining in the cured product. Preferably, when the cured product is being packaged, essentially no formaldehyde or water is evolving from the product.

It is not critical that a particular urea-formaldehyde resin solution and curing agent be employed according to the invention as long as urea-formaldehyde foam can be produced. Generally it is desirable for the combination resin solution and curing agent to form a mixture having between about 40 and 50% by weight solids, for forming the cured urea-formaldehyde particles and between about 16 and 25% by weight solids for the mixture that is utilized to form urea-formaldehyde foam for mixing with cured urea-formaldehyde particles.

A preferred liquid urea-formaldehyde resin for producing the cured urea-formaldehyde particles is marketed under the trade name Aerolite 333 by the Ciba-Geigy Corporation. Preferred urea-formaldehyde resins to produce urea-formaldehyde foam for mixing with the cured urea-formaldehyde particles include urea-formaldehyde resins and combinations thereof sold by the Ciba-Geigy Corporation under the following trade names and in the indicated ratios where the resins are combined: Aerolite UL 333, equal weight mixtures of Aerolite UL 333 and Aerolite 327, equal weight mixtures of Aerolite 333 and Aerolite 306, equal weight mixtures of Aerolite V and Aerolite 327, equal weight mixtures of Aerolite CBU and Aerolite 327; and a 3:1 weight ratio mixture of Aerolite 306 and Aerolite 327. Preferred curing agents for the foregoing resin solutions include curing agents sold by the Ciba-Geigy Corporation under the following trade names: Aerolite HL 703, Aerolite XD 824 and Aerolite D 892. These curing agents are mixtures of phosphoric acid and dodecylbenzenesulfonic acid. Aerolite HL 703 and Aerolite D 892 also include paratoluenesulfonic acid. Preferably, equal weight ratios of a preferred resin solution or solutions is utilized with a preferred curing agent.

It is to be understood that additional materials may be incorporated with the cured particles prior to mixing with the uncured foam. For example, a fire barrier material, such as a pH-balanced vermiculite that does not adversely affect the cured particles or the uncured foam can be added to produce a material that is a fire barrier. Similarly, a fiber material, such as fiberglass or cotton, for example, could also be incorporated to add strength to the final product.

It is to be understood that variations and modifications of the present invention may be made without departing from the scope of the invention. It is also to be understood that the scope of the invention is not to be interpreted or limited to the specific embodiments disclosed herein, but only in accordance with the appended claims when read in light of the foregoing specification.

We claim:

1. A method of producing cured urea-formaldehyde foam in desired shapes from urea-formaldehyde foam comprising:
   (a) forming discrete urea-formaldehyde particles from the urea-formaldehyde foam such that the discrete urea-formaldehyde particles, when cured, are between about one-half and six inches in length and between about one-quarter and one inch in cross-sectional dimension;
   (b) curing said discrete urea-formaldehyde particles;
   (c) mixing said cured particles with uncured urea-formaldehyde foam to form a resulting mixture that is a coherent mass, wherein said resulting mixture contains said uncured foam and cured particles in a volume ratio of uncured foam to cured particles of between about 1:1 and 1:4;
   (d) forming said resulting mixture into the desired shape; and thereafter
   (e) curing the uncured urea-formaldehyde foam present in said mixture to provide a cured mass of urea-formaldehyde of the desired shape.

2. The method as recited in claim 1 wherein said resulting mixture comprises about 75% cured urea-formaldehyde particles and about 25% uncured urea-formaldehyde foam by volume of said resulting mixture.

3. The method as recited in claim 1 wherein said foam is essentially uniformly dispersed among said cured particles.

4. The method as recited in claim 1 wherein said resulting mixture is formed into the desired shape by subjecting said resulting mixture to a compression force prior to curing said resulting mixture.

5. The method as recited in claim 1 wherein said cured particles are mixed with uncured urea-formaldehyde foam by injecting said uncured urea-formaldehyde foam through a blending head that is surrounded by the cured particles.

6. The method as recited in claim 1 wherein said urea-formaldehyde particles are formed by injecting a monofilament stream of uncured urea-formaldehyde foam upwardly and co-current with and surrounded by an airstream.

7. The method as recited in claim 1 further comprising enclosing the cured mass in a packaging material.

8. The product produced by the process of claim 1, 2, 3, 4, 5, 6 or 7.

9. A method for producing cured urea-formaldehyde foam into desired shapes from cured particles of urea-formaldehyde foam comprising:
   (a) mixing fluid urea-formaldehyde foam with cured particles that are between about one-half and six inches in length and between about one-quarter and one inch in cross-sectional dimension to form a resulting mixture that is a coherent mass, wherein said resulting mixture contains said uncured foam and cured particles in a volume ratio of uncured foam to cured particles of between about 1:1 and 1:4;
   (b) forming said resulting mixture into the desired shape; and thereafter
   (c) curing said resulting mixture.

10. The method as recited in claim 9 further comprising adding particulate fire barrier material to the cured particles prior to mixing with the fluid foam.

11. The method as recited in claim 9 further comprising adding fiber material to the cured particles prior to mixing with the fluid foam.

12. The product produced by the method of claims 9, 10, or 11.

* * * * *